Aug. 26, 1930.  G. I. VARNEY  1,774,305
ROD SHAPING DEVICE
Filed May 2, 1929
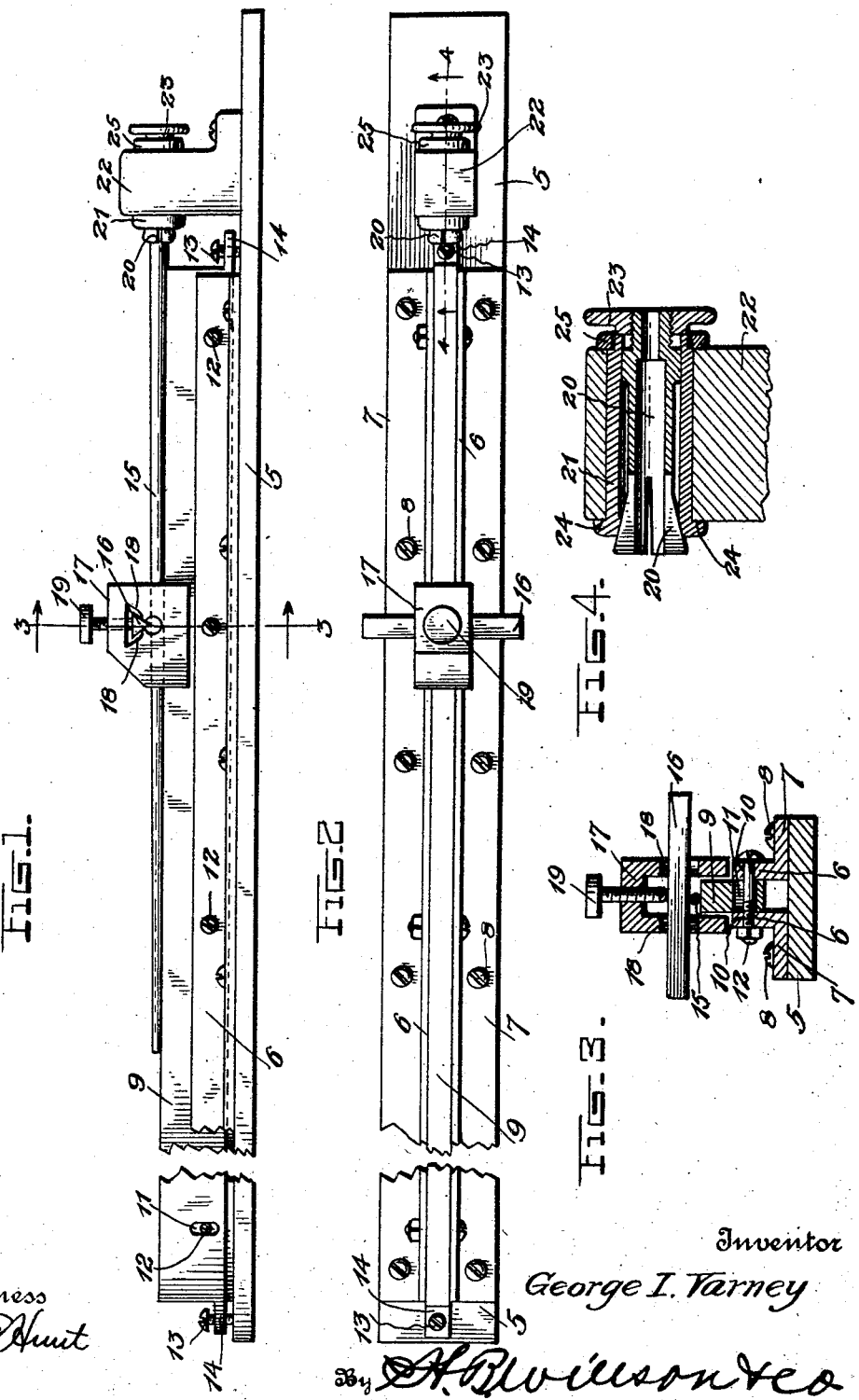
Witness
C. E. Hunt
Inventor
George I. Varney
By H. R. Willson & Co.
Attorneys Patented Aug. 26, 1930

1,774,305

UNITED STATES PATENT OFFICE

GEORGE I. VARNEY, OF MONTAGUE, MASSACHUSETTS, ASSIGNOR OF ONE-HALF TO GEORGE H. BRANN, OF BANGOR, MAINE

ROD-SHAPING DEVICE

Application filed May 2, 1929. Serial No. 359,880.

The invention aims to provide a new and improved device for quickly, rapidly and accurately shaping rods, such as lengths of bamboo or other wood for use in the manufacture of fishing rods.

In carrying out the above end, an elongated support is provided upon which to rest the rod to be shaped, a chuck is mounted at one end of said support to hold one end of the rod, and a cutter carrying slide is movable along the support and rod to shape the latter. When a comparatively large rod is being shaped, its periphery is much further from the center of the chuck than when shaping a smaller rod, and it is another object of the invention to provide novel means whereby the support and the chuck may be relatively adjusted to obtain different degrees of offset between said support and the chuck axis, so that regardless of the size of the rod, the support may effectively engage the same.

A still further aim is to provide a construction which is exceptionally simple and inexpensive, yet is efficient and in every way desirable.

With the foregoing in view, the invention resides in the novel subject matter hereinafter described and claimed, description being accomplished by reference to the accompanying drawing.

Fig. 1 is a side elevation partly broken away and in section.

Fig. 2 is a top plan view.

Figs. 3 and 4 are vertical sectional views on lines 3—3 and 4—4 of Figs. 1 and 2, respectively.

The preferred form of construction has been illustrated and while this construction will be herein specifically explained, it is to be understood that within the scope of the invention as claimed, variations may be made.

The numeral 5 denotes an appropriate base. Secured upon this base are two horizontally spaced flat-sided bars 6 which project upwardly from said base, the lower edges of said bars being preferably provided with flanges 7 secured by appropriate fasteners 8 to the base. Disposed longitudinally between the bars 6 and having a portion of its length projecting upwardly beyond these bars is a third flat-sided bar 9. The bars 6 are formed with transversely alined openings 10 and the bar 9 is provided with vertically elongated slots 11, and transverse bolts or other fasteners 12 pass through said openings and slots to mount the bar 9 between the bars 6 and to permit vertical adjustment of the former. For effecting this adjustment, set screws 13 are provided at the ends of bar 9, said screws being threaded through lugs 14 on said bar ends and contacting with the upper side of the base 5.

Bar 9 acts as a support for a rod 15 to be shaped, and the shaping of said rod is accomplished by an appropriate cutter 16 carried by an arched slide 17, which slide straddles the upwardly projecting portion of the bar 9 and may be reciprocated either by hand or by mechanical means. In the present showing, the opposite sides of the slide 17 are provided with openings 18 which receive the cutter 16, the latter being clamped in said openings by a screw 19 threaded through the crown of said slide. The cutter 16 is shown provided with three scraping or cutting edges, any one of which may be presented to the work and the openings 18 are so shaped that none of these edges can come in contact with any metal of the slide.

An expansible and contractible chuck 20 is provided at one end of the rod-supporting means, to hold one end of the rod 15. In the present showing, this chuck is mounted within a sleeve 21 which is rotatable within the upper portion of a post 22, which post is suitably secured to the base 5. 23 denotes an adjusting thumb nut for longitudinally shifting the chuck 20, the construction of the latter being such that it contracts around the rod when moved in one direction but expands when moved in the other direction.

In the present showing, one end of the sleeve 21 is provided with a shoulder 24 abutting one side of the post 22, and a nut 25 is threaded upon the other end of said sleeve to abut the opposite side of the post. When this nut is loosened, it permits rotation of the sleeve 21 and the chuck 20 and this is desirable when shaping rods of circular cross-section. However, when tightening the nut 25, the sleeve 21 is held against rotation and this positioning is very often of advantage when shaping flat-sided rods.

When a comparatively small rod is being held by the chuck 20, its periphery is of course much nearer to the axis of said chuck than when a larger rod is being held. Consequently, the bar 9 in order to effectively engage the periphery of the rod and support the latter must be adjusted according to the rod size. The novel mounting means for said bar 9 readily permits any necessary adjustments to be made.

In operating the device, the rod to be shaped is held at one end in the chuck and the bar 9 suitably adjusted, whereupon reciprocation of the slide 17 will cause the cutter 16 to operate upon the rod to shape and smooth it in the desired way. During this operation, the chuck 20 and sleeve 21 may be allowed to rotate or may be held against such rotation as may be most desirable.

On account of the existing advantages for the details disclosed, they are preferably followed. Attention is again invited however to the fact that within the scope of the invention as claimed, variations may be made.

I claim:—

1. A rod-shaping device comprising an elongated rod support, a chuck rotatably mounted at one end of said support for holding one end of the rod to be shaped, the rod-engaging face of said support being free of projections to allow rotation of the rod, a slide mounted for movement along said support, a cutter carried by said slide for shaping the rod as said slide is moved along the same, and means for holding said chuck against rotation when desired.

2. A rod shaping device comprising a base, an elongated rod support on said base, a post mounted on said base at one end of said rod support and having a bearing, a sleeve rotatably mounted in said bearing and provided with means whereby it may be held against rotation, a chuck mounted in said sleeve for holding one end of the rod to be shaped, a slide mounted for movement along said support, and a cutter carried by said slide for shaping the rod as said slide is moved along the same.

3. A rod shaping device comprising an elongated rod support, a chuck rotatably mounted at one end of said support for holding one end of the rod to be shaped, a slide mounted for movement along said support, a cutter carried by said slide for shaping the rod as said slide is moved along the same, and means for relatively adjusting said rod support and chuck to effect various amounts of offset between said support and said chuck axis.

4. A rod shaping device comprising two fixedly mounted parallel bars, a third bar mounted longitudinally between said two bars and adapted for edgewise adjustment, said third bar having a portion of its width projecting edgewise beyond said two bars, the longitudinal edge of said projecting portion being adapted to support the rod to be shaped, a rotatably mounted chuck at one end of said bars to hold said rod, a slide to straddle said projecting portion of said third bar and the rod, a cutter carried by said slide for shaping the rod as the slide is moved along said third bar and the rods and means for holding said third bar when adjusted edgewise into different offset relations with the axis of said chuck.

5. A rod shaping device comprising a base, two bars secured to said base and having flat parallel inner sides at an angle thereto, a third flat-sided rod-supporting bar disposed longitudinally between said two bars in contact with said flat sides thereof, a rotatably mounted chuck at one end of said bars for holding the rod to be shaped, said two bars having transversely alined openings, said third bar being provided with transverse slots registering with said openings, fasteners passing through said openings and slots but allowing edgewise projection of said third bar different distances beyond said two bars, allowing it to be set in different offset relations with the axis of said chuck, adjusting means at the ends of said third bar for effecting said projection of the latter any desired distance beyond said two bars, and a cutter-carrying slide to straddle the projecting portion of said third bar and said rod.

In testimony whereof I have hereunto affixed my signature.

GEORGE I. VARNEY.